(12) United States Patent
Sarna

(10) Patent No.: US 7,430,329 B1
(45) Date of Patent: Sep. 30, 2008

(54) HUMAN VISUAL SYSTEM (HVS)-BASED PRE-FILTERING OF VIDEO DATA

(75) Inventor: Lalit Sarna, Mountain View, CA (US)

(73) Assignee: Vidiator Enterprises, Inc., Nassau (BS)

( * ) Notice: Subject to any disclaimer, the term of this patent is extended or adjusted under 35 U.S.C. 154(b) by 910 days.

(21) Appl. No.: 10/815,280

(22) Filed: Mar. 30, 2004

Related U.S. Application Data

(60) Provisional application No. 60/525,264, filed on Nov. 26, 2003.

(51) Int. Cl.
G06K 9/36 (2006.01)
G06K 9/40 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .............. 382/239; 382/240; 382/261; 348/404.1; 375/240.02

(58) Field of Classification Search ......... 382/232, 382/239, 240, 261–263; 375/240.02; 348/404.1
See application file for complete search history.

(56) References Cited

U.S. PATENT DOCUMENTS

| | | | |
|---|---|---|---|
| 5,231,484 A * | 7/1993 | Gonzales et al. | 375/240.04 |
| 5,801,778 A | 9/1998 | Ju | |
| 6,229,850 B1 | 5/2001 | Linzer et al. | |
| 6,337,881 B1 | 1/2002 | Chaddha | |
| 6,535,632 B1 * | 3/2003 | Park et al. | 382/164 |
| 7,184,578 B2 * | 2/2007 | Simon et al. | 382/118 |
| 7,266,149 B2 * | 9/2007 | Holcomb et al. | 375/240.12 |
| 7,272,180 B2 | 9/2007 | Dambrackas | |
| 2002/0165844 A1 * | 11/2002 | Lee et al. | 706/61 |
| 2002/0186890 A1 * | 12/2002 | Lee et al. | 382/239 |
| 2002/0196355 A1 * | 12/2002 | Hiroshige et al. | 348/252 |
| 2003/0001964 A1 * | 1/2003 | Masukura et al. | 348/441 |
| 2003/0206664 A1 * | 11/2003 | Gomila et al. | 382/268 |
| 2004/0117427 A1 | 6/2004 | Allen et al. | |
| 2005/0013359 A1 * | 1/2005 | Srinivasan | 375/240.03 |
| 2008/0002902 A1 * | 1/2008 | Lin et al. | 382/261 |

OTHER PUBLICATIONS

Duda et al. (Pattern Classification and Scene Analysis, 1973; pp. 130-134).*
U.S. Appl. No. 10/763,772, filed Jan. 22, 2004, Sarna.

* cited by examiner

*Primary Examiner*—M Bella
*Assistant Examiner*—Yubin Hung
(74) *Attorney, Agent, or Firm*—Seed IP Law Group PLLC

(57) ABSTRACT

An adaptive pre-processing technique is provided to reduce perceptually unimportant information in a frame (such as some of the high frequency information) so as to optimize compression efficiency and to maximize perceived video quality of a compressed video sequence for a given bit rate. This pre-processing includes a combination of performing pre-filtering of video data to remove high frequency components and to smooth out high frequency texture information within object boundaries, based at least in part on human visual system characteristics. The technique is adaptive in that feedback regarding the current state of the encoder is used to change the filtering strength or region of support for subsequent frames, as needed, in order to maintain the bit budget while still generating visually acceptable video quality.

40 Claims, 2 Drawing Sheets

HUMAN VISUAL SYSTEM (HVS)-BASED PRE-FILTERING OF VIDEO DATA

CROSS REFERENCE TO RELATED APPLICATION

The present application claims the benefit under 35 U.S.C. § 119(e) of U.S. Provisional Patent Application Ser. No. 60/525,264, entitled "HUMAN VISUAL SYSTEM (HVS)-BASED PRE-FILTERING OF VIDEO DATA," filed Nov. 26, 2003, with inventor Lalit Sarna, assigned to the same assignee as the present application and which is incorporated by reference in its entirety.

TECHNICAL FIELD

The present disclosure generally relates to video encoding, and more particularly but not exclusively, relates to pre-processing video data prior to its encoding in a manner that is adaptive and that improves coding efficiency, while still providing visually acceptable video images.

BACKGROUND INFORMATION

Software video compression or video encoding is a computationally expensive task. In a raw video sequence having an excessively large number of bits, the encoding process and resulting data transmission would be too intolerably slow for most viewers if every single one of the bits is encoded. Therefore, various techniques are implemented for reducing the amount of bits to encode, reducing frame rates, reducing resolution, and other reduction, for purposes of decreasing the overall size of the compressed video. This reduction is sometimes known as "lossy compression," where in a given sequence of video frames, some savings are achieved by predicting current frames from previous frames and removing some perceptually unimportant data from the video sequence. The amount of data that is removed depends on the bit budget constraints.

An illustrative example is the encoding of images having sharp edges or other fine detail, such as sharp edges on objects, surface textures, minute facial features of individuals, and the like. Sharp edges contain high frequency components, and require a large number of bits to encode. Thus, the presence of complex high frequency components in video with a limited bit budget for encoding can take heavy tolls on video quality. To match the bit rate constraints, one approach is to heavily quantize the residual spatial information after prediction and spatial information for non-predicted parts in a compressed video sequence, to reduce the number of bits required to represent video sample values. Quantization of high frequency coefficients also leads to undesirable blocking, ringing noise artifacts, and mosquito artifacts in the resulting images.

Furthermore, video frames that attempt to retain their images' sharp edges and fine texture information, regardless of the degree of quantization, will nevertheless have more bits per frame to encode as compared to other frames that do not have sharp edges. Another factor that adversely affects encoded video quality is excessive frame dropping due to lack of available bits. Frame dropping generally occurs with variable frame rate encoders that often drop frames when there are insufficient bits available to encode a video frame.

The lack of bits can be due to two reasons. First, the current frame is estimated to produce significantly more than rationed bits for that frame (as would occur if the frame had sharp edges) and therefore that frame is dropped, resulting in increased distance between predicted frames, which leads to poor prediction between frames and thus higher bit budget requirements. Second, previously encoded frames may have produced more than estimated bits and have thus led to undesired levels of video buffer verifier (VBV) buffer fullness. Since the VBV buffer operates according to a "leaky bucket" model that needs to remain full while at the same time balancing the amount of bit input and bit output, undesired levels of VBV buffer fullness will cause some incoming frames to be dropped (since all of their bits cannot be buffered) until the VBV buffer empties to where it can accommodate new incoming frames.

Because frame dropping results in "jerky" video (which is unappealing to viewers), there is often a maximum limit on the number of consecutive frames that can be dropped. To respect the maximum limit, higher quantization (Q) values (i.e., large quantization steps) are used to reduce the number of bits. However, using large Q values leads to abrupt changes in video quality and an unpleasant viewer experience.

One approach to reduce frame dropping and compression artifacts is to filter the video sequence to remove the high frequency components (e.g., video noise, sharp edges, small details, fine texture information, etc.), thereby avoiding the artifacts that are generated as a result of quantization and bit budget constraints (frame dropping). This helps distribute the available bits in encoding low frequency data at higher quality (lower quantization Q) and/or avoids excessive frame dropping due to lack of available bits.

However, low pass filtering leads to blurring of source images (since the high frequency components that represent the sharp edges are removed), and other frames that use this image for reference will also propagate the blurring. While blurred images are easier to encode, they are undesirable in some situations from a video quality point of view. Therefore, there is clearly a tradeoff between having a soft smooth image sequence (e.g., blurred images), versus a crisp image sequence having artifacts and possible higher frame dropping.

BRIEF SUMMARY OF THE INVENTION

According to one aspect of the invention, a method to process video data dynamically is provided. The method adaptively filters at least some high frequency components from video frames, and adaptively filters texture information within object boundaries in an image in the video frame. These filtered video frames are encoded, and a property of either or both of the filterings is dynamically adapted based on a set of criteria, including feedback information from the encoding.

DETAILED DESCRIPTION

Figure 1:
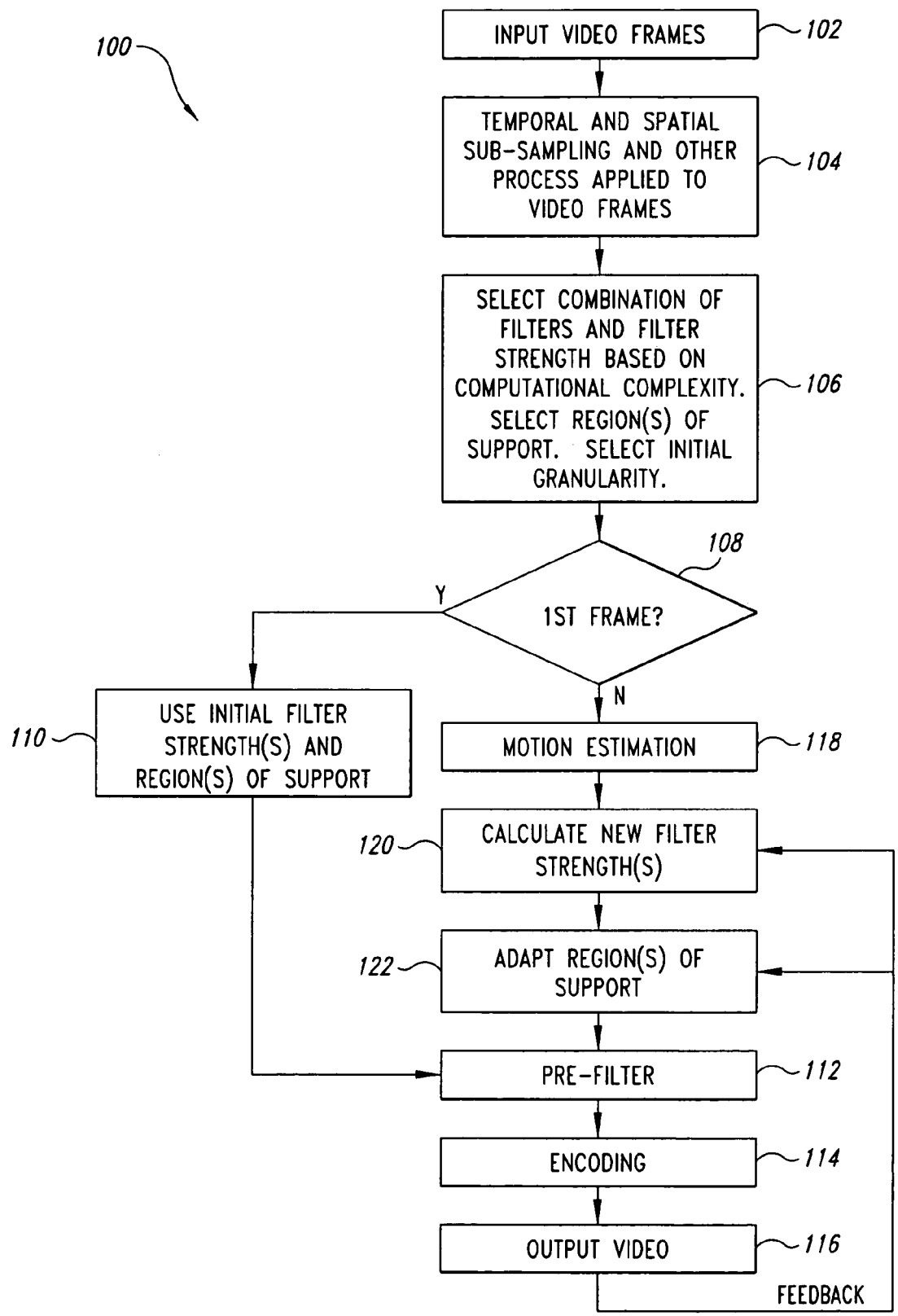
FIG. 1 is a flowchart that illustrates a Human Visual System (HVS)-based pre-processing algorithm according to an embodiment.

Embodiments of Human Visual System (HVS)-based pre-processing (including pre-filtering) of video data are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One embodiment uses adaptive pre-processing techniques to reduce perceptually unimportant information in a frame (such as some of the high frequency information) so as to optimize compression efficiency and to maximize perceived video quality of a compressed video sequence for a given bit rate. This pre-processing includes a combination of performing pre-filtering of video data to remove high frequency components and to smooth out high frequency texture information within object boundaries. An embodiment is adaptive in that feedback regarding the current state of the encoder is used to change the filtering strength for subsequent frames, as needed, in order to maintain the bit budget while still generating visually acceptable video quality.

Such pre-filtering is HVS-based in an embodiment. HVS-based systems operate on the fact that visual sensitivity of humans is inversely proportional to the motion velocity of objects. One may try to maximize the viewer's experience by exploiting the well-known facts about the human visual system. The human visual system responds to similar filters differently depending on the type of content being viewed. For example: the human eye takes a certain amount of time to adjust and focus when there are abrupt changes in images (as would be the case with image motion in video). The higher the amount of motion in an image, the less perceptive the human eye is to sharp edges. It has been shown that the human eye, in fact, has a poor response to abrupt changes in a video sequence.

Therefore, an embodiment of the invention uses a first pre-filtering to remove high frequency components in video sequences where abrupt changes in scene or motion or other image are present. This filtering generates lower quality images (e.g., blurred images, since the high frequency components are removed) in the beginning frames in a sequence, and then the filtering strength is reduced to improve the sharpness of the image in subsequent frames as the human eye adjusts to the motion. The same concept can be applied to parts of a video frame. During motion estimation, one can determine which parts of a video frame have new or changed information as compared to the previous frames. These parts can have relatively higher pre-processing compared to the rest of the frame.

An embodiment is also based on findings that a lack of high frequency texture information (which is hard to encode) does not have a severe impact on perceptive quality at low bit rates and at low spatial resolution. Therefore, a second pre-filtering is performed along with the first pre-filtering to remove high frequency texture information within object boundaries in the image. These combined first and second pre-filtering operations reduce the number of bits associated with the high frequency information, thereby allowing distribution of the remaining available bit budget for encoding low frequency data in the frames at a higher quality and/or thereby avoiding excessive frame dropping.

An embodiment adaptively changes one or more properties (or characteristics) of either or both of the filters, such as the strength of the filters and their region of support, based on at least one of a set of criteria. One of these criteria is the quantization Q factor. To avoid abrupt changes in video quality and an unpleasant viewer experience, the strength of the filters (to reduce the number of bits) is increased as the VBV buffer overshoots and with each dropped frame. The more data is filtered out gradually in response to the fullness of the VBV, the less remaining data needs to be encoded, thereby leading to a gradual change of quality over multiple frames, which also leads to a gradual change in Q factor rather than an undesirable abrupt changes in Q factor.

According to an embodiment, there are certain pieces of information that are used to determine the appropriate pre-filtering technique for each frame. These pieces of information include at least one or more of the following:

Level of quantization=Q

Motion velocity of objects in frame in reference to the previous frame

Abrupt changes in the scene

Number of consecutive frames skipped

VBV buffer fullness

In temporarily compressed videos, estimates of motion velocity and abrupt changes in a scene can be computed after motion estimation. As far as quantization level is concerned, the rate control algorithm enables prediction of the lower limit on the quantization value of the frame based on a previous quantization history. Furthermore, since motion and spatial complexity of a video sequence varies with time and quantization levels vary with bit rate, an embodiment provides the filtering technique with capability to be scalable and adaptive. The number of consecutive frames skipped and VBV buffer fullness are state variables maintained by the encoder.

According to an embodiment, building blocks of the filtering technique are a set of two filters with programmable regions of support and strengths:

1) A low pass filter with a programmable region of support and programmable filtering strength, which is used to remove high-frequency coefficients. A Gaussian filter is one, non-limiting example of a low pass filter that can be used. Filter strength can be increased or decreased according to various embodiments by changing certain filter properties. The change in filter strength determines the amount of edge information that is filtered out and that remains; and 2) A texture-smoothing non-linear filter with a programmable region of support and programmable strength, which is used to smooth out high-frequency texture information within object boundaries. In a non-linear filter, changing the strength according to an embodiment involves changing one or more thresholds or other filter properties, which determine the amount of texture info to be filtered out and that is to remain.

Both filters are combined, and their strengths and region of support of both filters are dynamically adapted based on content and feedback from encoder in one embodiment. It is appreciated that both filters' functionality can be combined into a single filter or multiple filters (e.g., more than two filters) may be provided in an embodiment to provide the functionality.

For Gaussian or other low pass filters, an embodiment adaptively changes the variance of the low pass filter to control the amount of smoothing performed. For texture-smoothing non-linear filters, an embodiment adapts the non-linear thresholds that determine the similarity between textures. The higher the threshold, the stronger the smoothing of the texture detail.

Furthermore, the filter and filter parameters can be optimally selected at varying granularities (frame, macro block, block). An embodiment of the technique can be applied only to specific regions of an image or the entire frame.

Regions of support for the filters primarily are selected by the desired computational complexity in one embodiment. The larger the region of support, the higher the computational complexity and the better the filtering results.

FIG. 1 is a flowchart 100 that illustrates an HVS-based pre-processing algorithm according to an embodiment and which is helpful in illustrating the principles described above. At least some of the elements in the flowchart may be embodied as software or other machine-readable instruction stored on a machine-readable medium. One or more processors can execute such software. It is appreciated that the various operations depicted therein need not necessarily occur in the exact order shown. Moreover, various operations can be added, removed, modified, or combined in other embodiments.

At a block 102, input video frames are received. The received video frames can include raw unformatted video, live video feeds, formatted video, or other forms of uncompressed (or uncompressed) video, including audio. As an example, the input video frames can be uncompressed video having RGB24 color format, 640×480 resolution, 30 frames/second frame rate, etc.

At a block 104, the input video frames may optionally have some processing applied to them. For example, temporal and spatial sub-sampling may be performed to change the frame rate and resolution, respectively. Color format conversion and anti-aliasing filtering can be performed as well. Other types of optional processing may be applied at the block 104, as a person skilled in the art having the benefit of this disclosure will appreciate. Accordingly, for the sake of brevity, detailed discussion of these optional processing procedures will not be provided herein.

According to the embodiment of FIG. 1, the algorithm involves the following at a block 106:

1) Select a combination of filters and filter size based on desired computational complexity; and
2) Determine initial filter strengths.

Additionally, the region(s) of support for the filters may be selected, as well as an initial granularity for filter parameters, such as whether filtering or other application of the algorithm is to be performed at a frame, macroblock, or block level. The granularity may be adaptively changed as needed later on.

For the initial filter strength of one embodiment, Initial Filter Strength=(C1/Bits Per Macro Block) normalized to the range of [0 . . . 100], wherein C1 is a constant to scale 1/bits per macroblock to the range of [1-100].

At a block 108, the algorithm determines whether the current frame is the first frame. If the current frame is the first frame, then there are no reference frames from which to base motion estimation, motion velocity, or other prediction or historical behavior. Therefore, the initial filter strength(s) and initial region(s) of support are selected at a block 110. At a block 112, the pre-filtering (e.g., HVS-based pre-filtering and/or other filtering) is performed, followed by the encoding of that frame at a block 114. The encoder at a block 116 produces an coutput video frame.

Also at the block 116, feedback information is provided by the encoder. Such feedback information can be used to adaptively change the filter strength(s) and/or region(s) of support, and can include information such as prior quantization levels or other quantization history, VBV buffer fullness, number of frames skipped, rate control data, and so forth.

Back at the block 108, if the current frame is not the first frame, then there are previous frame(s) that may be used as reference frames. Accordingly, motion estimation can be performed at a block 118 for a level of granularity desired (frame, block, macroblock).

At a block 120, a new adaptive filter strength (NS) can be calculated based at least in part on the feedback information and other characteristics associated with the video frames. In an embodiment, the new adaptive filter strength (NS) can be calculated as follows:

$$NS=[W2*C2*(QEst)+W3*C3*MV+W4*C4*PE+W1*(C1/\text{Bits Per Macro Block})+W5*C5*VBV \text{ Buffer fullness}+W6*C6*\text{number of frames dropped}]/C7,$$

wherein

QEst=an estimate on the lower bound on the quantizer;

C2=a scaling constant to expand the range of Q to [1-100];

MV=motion velocity estimate based on motion vector magnitude (0 for intra blocks);

C3=a scaling constant to scale the range of MV to [1-100];

PE=a prediction error derived from sum of absolute difference (SAD) for inter blocks. This helps to measure the amount of change in that specific block. For intra blocks, PE is set to a high constant value since it is an abrupt change from the previous scene;

C4=a constant to scale the prediction error to the range of [1-100];

C1=a constant to scale 1/bits per macroblock to the range of [1-100];

C5=a constant to scale the range of VBV buffer fullness to the range of [1-100]. VBV Buffer fullness is the fullness level of the rate control buffer;

C6=a constant to scale the number of frames dropped from range of [1-100];

W1, W2, W3, W4, W5, W6 are all weighting constants to adjust the influence of the various factors in the equation. Different weighting schemes can be developed to best suit different types of video sequences on a case-by-case basis. For example, sequences with high motion may have a higher weighting assigned to the motion vector energy MV. Sequences with high scene changes may have emphasis on PE; and C7=normalization constant=(W1+W2+W3+W4+W5+W7).

In an embodiment, the filter strength is ranged between [1-100]. The range is mapped variance levels and non-linear threshold levels for both filters.

According to one embodiment, the new filter strength can also undergo further refinement at the block 120. For example, the algorithm may calculate Δs, wherein Δs=the difference between old filter strength and new filter strength. An abrupt high change in filter strength can lead to abrupt changes in video quality, thereby leading to a bad perceptive experience. Hence, the range of change is limited by an embodiment. One of the various ways to determine a suitable range of change in filter strength is to heuristically determine suitable ranges for various classes of video sequences and have a look up table. If Δs exceeds the range, Δs is limited to the range.

At a block 122, the region(s) of support of the filters may also be adapted or otherwise changed as needed. The granularity (frame, macroblock, block) of which to apply the filtering and other portions of the algorithm may also be changed or updated at a block 122.

Using these new updated filter strength(s) and region(s) of support, the pre-filtering is performed at the block 112, and the video frames are encoded at the block 114 to produce output video at the block 116. Feedback is provided to either one or both the blocks 120 and 122 to allow new filter strength(s) and/or region(s) of support to be used, if needed, for subsequent frames.

Thus, a pre-processing filter is provided that intelligently exploits the information that is readily available at various stages of video encoding. The technique is flexible and can be used for any of the existing video compression standards such as MPEG1, 2, 4, H.263, H.264, and others.

Figure 2:
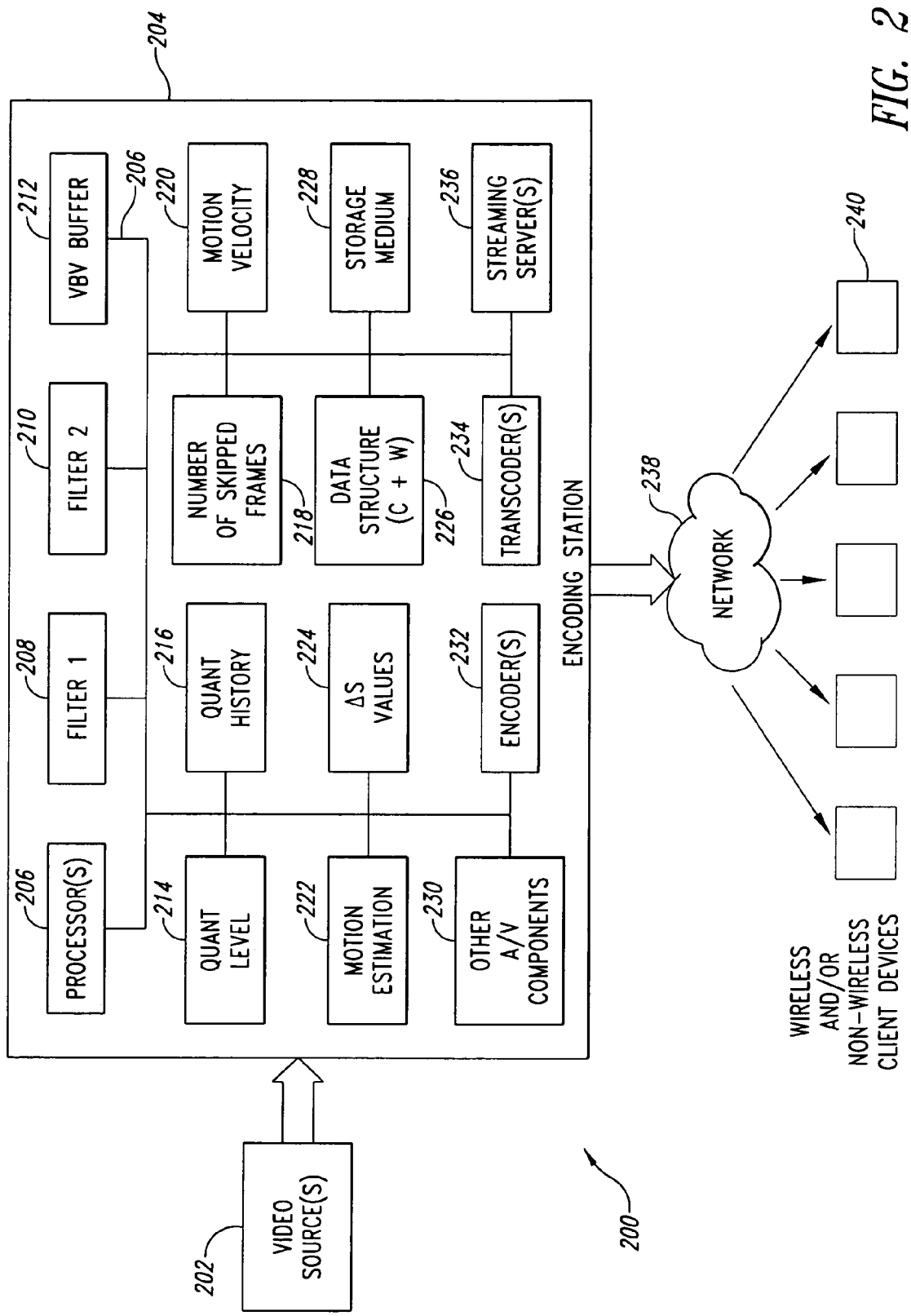
FIG. 2 is a block diagram of an embodiment of a system in which the algorithm of FIG. 1 may be implemented.

FIG. 2 is a block diagram of a system 200 in which an embodiment of the HVS-based pre-processing algorithm may be implemented. For the sake of simplicity of explanation, only components that are helpful in understanding operation of an embodiment are shown in FIG. 2 and described herein.

The system 200 of FIG. 2 includes one or more video sources 202 to provide the input video frames depicted in the block 102 of FIG. 1. The input video frames are provided to an encoding station 204, which in turn provides encoded output video to one or more wireless (and/or non-wireless) client devices 240. The encoding station 204 may provided the encoded output video to the client devices 240 via a network 238, such as a wireless network, the Internet, a satellite network, telephone network, other wired network, or any combination thereof.

Various hardware and software components are shown in detail in the encoding station 204 of FIG. 2. A line 206 symbolically depicts a bus or other hardware or software interaction between the various components. In general, the encoding station 204 includes one or more processors 206 and a machine-readable storage medium 228 that stores machine-readable instructions executable by the processor 206 and data. For the sake of illustration, at least some of the software elements and data that can be stored in the storage medium 228 or elsewhere are shown as separate elements.

The encoding station 204 includes a first filter 208 and a second filter 210, which may be embodied in software. The first filter 208 can be the low pass filter described above, while the second filter 210 can be the texture-smoothing non-linear (or linear) filter described above. A VBV buffer is shown at 212 and can provide information indicative of its fullness, to be maintained as a state variable by an encoder 232. A number of consecutive frames skipped/dropped is shown at 218, and can also be maintained as a state variable by the encoder 232 in an embodiment.

Quantization level 214 and quantization history 216 information are tracked and stored. Additionally, motion velocity 220 and motion estimation 222 information are tracked and stored. If any Δs filter changes are calculated and used by the algorithm, such Δs-related information (including pre-set ranges and calculated values) are tracked and stored.

A data structure 226 can store any of the information used in the algorithm. For instance, the data structure 226 can include a look-up table having the C and W coefficients from the NS equation above. Alternatively or additionally, the C and W coefficients can be kept in the data structure 226 as a variable, fixed code, variable code, and the like.

Other audiovisual processing components 230 may be present. These can includes, for example, software or hardware components to perform temporal or spatial sub-sampling, color format conversion, anti-aliasing, discrete cosine transform (DCT), and the like.

In an embodiment where the incoming video frames are to be encoded into multiple unique video streams, one or more transcoders 234 can be present in the encoding station. The transcoder 234 can be integrated with the encoder 232 in one embodiment. A streaming server 236 sends the output video to the network 238.

In an embodiment of a system where a single incoming video stream is encoded into multiple unique output video streams (i.e., output video streams having at least some different characteristics from one another, such as frame rate, bit rate, color format, encoding format, and the like) in a single encoding session, the HVS-based pre-processing techniques described herein can be integrated into the system to perform the HVS-based pre-processing for each respective output video stream. Data associated with the HVS-based pre-processing can be re-used or shared in such a system, if and when appropriate, so as to reduce computational complexity or to eliminate any redundant processing. Examples of techniques for providing hierarchical data reuse are disclosed in U.S. patent application Ser. No. 10/763,772, entitled "METHOD AND SYSTEM FOR HIERARCHICAL DATA REUSE TO IMPROVE EFFICIENCY IN THE ENCODING OF UNIQUE MULTIPLE VIDEO STREAMS," filed Jan. 22, 2004, assigned to the same assignee as the present application, and incorporated herein by reference in its entirety.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, an embodiment of the algorithm has been described above as being adaptive based on several criteria that factor into the equation. It is appreciated that the equation may be adjusted on a case-by-case basis such that certain criteria may be given less weight (or no weight) or more weight, as a particular situation may dictate.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to process video data dynamically, the method comprising:

adaptively filtering at least some high frequency components from video frames;

adaptively filtering texture information within object boundaries in an image in the video frames;

encoding these filtered video frames; and dynamically adapting a property of either or both of the filterings based on a set of criteria, including feedback information from the encoding, wherein dynamically adapting the property of either or both of the filterings includes determining whether to increase filter strength based on whether a difference between old and new filter strengths is within a range.

2. The method of claim 1 wherein said dynamically adapting the property further includes dynamically adapting a region of support of either one or both of the filterings based on the set of criteria.

3. The method of claim 1 wherein said dynamically adapting the property further includes dynamically increasing filter strength of either or both of the filterings if said difference is within said range.

4. The method of claim 1 wherein said filtering the high frequency components includes filtering these components from at least one of a selectable frame, macroblock, and block granularity.

5. The method of claim 1 wherein said dynamically adapting the property of either or both of the filterings based on the set of criteria further includes dynamically adapting based on at least one of quantization level, quantization history, motion velocity, changes in scene, number of consecutive frames skipped, and buffer fullness.

6. The method of claim 5, further comprising using a plurality of weighting factors for at least some of the criteria in the set.

7. The method of claim 1 wherein said filtering at least some high frequency components includes low pass filtering the high frequency components.

8. The method of claim 1 wherein said filtering texture information within object boundaries includes texture smoothing using a non-linear filter.

9. The method of claim 1, further comprising using a lookup table to determine whether the difference is within the range.

10. The method of claim 1, further comprising performing additional processing to the video frames prior to encoding.

11. The method of claim 1, further comprising sharing at least some data between filtering processes respectively associated with multiple unique output video streams that are generated from a single input video stream during a single encoding session.

12. A method to process video data, the method comprising:
filtering high frequency information from at least some video frames having abrupt image changes;
smoothing texture information within object boundaries of an image in the video frames;
adaptively changing, if necessary, a characteristic of either one or both of the filtering and smoothing in response to a set of criteria; and
maintaining a level of either one or both of the filtering and smoothing if a difference in level changes exceeds a range.

13. The method of claim 12 wherein said adaptively changing the characteristic of the filtering includes reducing strength of the filtering as a human visual system adjusts to the image changes.

14. The method of claim 12 wherein said adaptively changing the characteristic of either one or both the filtering and the smoothing includes changing the characteristic based on at least one of quantization level, quantization history, motion velocity, changes in scene, number of consecutive frames skipped, and buffer fullness.

15. The method of claim 12 wherein said adaptively changing the characteristic includes adaptively changing a region of support of either one or both of the filtering and smoothing in response to the set of criteria.

16. The method of claim 12 wherein either one or both of the filtering and smoothing is performed at a selectable one of a frame, block, and macroblock granularity.

17. The method of claim 12, further comprising adjusting influence of the criteria in the set using weighting factors.

18. The method of claim 12, further comprising:
performing additional processing of the video frames; and
encoding the video frames having the high frequency information filtered therefrom and having the smoothed texture information.

19. The method of claim 18, further comprising using feedback information from the encoding to adjust the characteristic of at least one of the filtering and smoothing.

20. An article of manufacture, comprising:
a computer-readable medium having computer-executable instructions stored thereon to cause a computer to process video data dynamically, by:
filtering high frequency information from at least some video frames having abrupt image changes;
smoothing texture information within object boundaries of an image in the video frames;
adaptively changing a characteristic, if necessary, of either one or both of the filtering and smoothing in response to a set of criteria; and
maintaining a level of either one or both of the filtering and smoothing if a difference in level changes exceeds a range.

21. The article of manufacture of claim 20 wherein the computer-executable instructions to cause the computer to process video data by adaptively changing the characteristic of the filtering include computer-executable instructions to cause the computer to process video data by reducing strength of the filtering as a human visual system adjusts to the abrupt image changes.

22. The article of manufacture of claim 20 wherein the computer-executable instructions to cause the computer to process video data by adaptively changing the characteristic of either one or both the filtering and the smoothing include computer-executable instructions to cause the computer to process video data by changing the characteristic based on at least one of quantization level, quantization history, motion velocity, changes in scene, number of consecutive frames skipped, and buffer fullness.

23. The article of manufacture of claim 20 wherein the computer-executable instructions to cause the processor to process video data by adaptively changing the characteristic include computer-executable instructions to cause the computer to process video data by adaptively changing a region of support of either one or both of the filtering and smoothing in response to the set of criteria.

24. The article of manufacture of claim 20 wherein the computer-readable medium further includes computer-executable instructions stored thereon to cause the processor to process video data, by:
selecting one of a frame, block, and macroblock granularity to perform either one or both of the filtering and smoothing; and
adjusting influence of the criteria in the set using weighting factors.

25. The article of manufacture of claim 20 wherein the computer-readable medium further includes computer-executable instructions stored thereon to cause the computer to process video data by encoding the filtered and smoothed video frames and using information from the encoding to adjust the characteristic.

26. A system for processing video data dynamically, the system comprising:
a means for adaptively filtering at least some high frequency components from video frames;

a means for adaptively filtering texture information within object boundaries in an image in the video frames;

a means for encoding these filtered video frames; and a means for dynamically adapting a property of either or both of the filterings based on a set of criteria, including feedback information from the encoding, and for determining whether to increase filtering strength based on whether a difference between old and new filtering strengths is within a range.

27. The system of claim 26 wherein the means for dynamically adapting the property performs at least one of adapting a strength and dynamically adapting a region of support, of either one or both of the filterings based on the set of criteria.

28. The system of claim 26 wherein the means for filtering the high frequency components filters these components from at least one of a selectable frame, macroblock, and block granularity.

29. The system of claim 26, further comprising:

a means for using a plurality of weighting factors for at least some of the criteria in the set;

a means for performing additional processing to the video frames prior to encoding; and a means for receiving input video frames and providing output video frames to client devices.

30. An apparatus to process video data dynamically, the apparatus comprising:

a first filter to filter at least some high frequency components from video frames;

a second filter to smooth texture information within object boundaries in an image in the video frames;

an encoder coupled to the first and second filters to encode these filtered video frames; and a processor, coupled to the encoder and to the filters, adapted to dynamically adapt a property of either or both of the filters based on a set of criteria, including feedback information from the encoder, wherein the processor is adapted to determine whether to change a filter strength of at least one of the filters based on whether a difference between old and new filter strengths is within a range.

31. The apparatus of claim 30 wherein the processor is adapted dynamically change a filter strength of at least one of the filters according to behavior of a human visual system in response to image changes.

32. The apparatus of claim 30 wherein the first filter includes a low pass filter, and wherein the second filter includes a non-linear filter.

33. The apparatus of claim 30 wherein at least one of the first and the second filters has a programmable region of support.

34. The apparatus of claim 33 wherein the region of support is adapted to be dynamically changed by the processor based on the set of criteria.

35. The apparatus of claim 30, further comprising additional audiovideo processing components, at least one transcoder, and a streaming server.

36. The apparatus of claim 30 wherein the filters are adapted to be applied to at least one of a selectable frame, block, and macroblock granularity.

37. The apparatus of claim 30 wherein the set of criteria include at least one of quantization level, quantization history, motion velocity, changes in scene, number of consecutive frames skipped, and buffer fullness.

38. The apparatus of claim 37 wherein the processor is adapted to apply a weighting factor to each of the criteria in the set to adjust its influence over filter strengths of the filters.

39. The apparatus of claim 30 wherein the first filter has a strength that can be changed based on an amount of edge information to be filtered from the video frames.

40. The apparatus of claim 30 wherein the second filter has a strength that can be changed based on an amount of texture information to be filtered from the video frames.

* * * * *